(12) United States Patent
Zimmer et al.

(10) Patent No.: US 6,575,474 B1
(45) Date of Patent: Jun. 10, 2003

(54) SEALING ELEMENT FOR CABLE FITTINGS

(75) Inventors: Rainer Zimmer, Schalksmuhle (DE); Oliver Lapp, Wuppertal (DE)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/743,728

(22) PCT Filed: Jul. 1, 1999

(86) PCT No.: PCT/DE99/01985

§ 371 (c)(1),
(2), (4) Date: Feb. 26, 2001

(87) PCT Pub. No.: WO00/04618

PCT Pub. Date: Jan. 27, 2000

(30) Foreign Application Priority Data

Jul. 15, 1998 (DE) .......................................... 198 31 823

(51) Int. Cl.⁷ ............................................ H02G 15/013
(52) U.S. Cl. ...................... 277/603; 277/622; 277/624; 174/93
(58) Field of Search ................................ 277/603, 606, 277/616, 621, 622, 624; 174/77 R, 93, 65 R, 65 SS, 65 G

(56) References Cited

U.S. PATENT DOCUMENTS

| | | | | |
|---|---|---|---|---|
| 3,935,373 A | * | 1/1976 | Smith et al. ............... | 174/77 R |
| 4,021,604 A | * | 5/1977 | Dola et al. ...................... | 174/51 |
| 4,149,028 A | * | 4/1979 | Gressitt et al. ............. | 174/52.1 |
| 4,250,348 A | * | 2/1981 | Kitagawa ................. | 174/65 SS |
| 4,544,800 A | * | 10/1985 | Katsuura ................ | 174/65 SS |
| 4,872,338 A | * | 10/1989 | Rivero-Olmedo ............ | 285/32 |
| 5,167,527 A | * | 12/1992 | Clark .......................... | 29/857 |
| 5,434,360 A | * | 7/1995 | Ehrenfels .................... | 174/151 |
| 5,517,592 A | * | 5/1996 | Grajewski et al. ........ | 174/70 R |
| 5,545,854 A | * | 8/1996 | Ishida .......................... | 16/2.2 |
| 5,678,866 A | * | 10/1997 | Mina ...................... | 174/153 A |
| 5,731,543 A | * | 3/1998 | Jorgensen ................. | 174/65 R |
| 5,787,219 A | | 7/1998 | Mueller et al. ............. | 385/134 |
| 5,998,734 A | * | 12/1999 | Kerestan et al. ............. | 174/53 |
| 6,395,985 B1 | * | 5/2002 | Djeddah ...................... | 174/59 |

FOREIGN PATENT DOCUMENTS

| | | | |
|---|---|---|---|
| EP | 0408967 B1 | 7/1990 | ......... H02G/15/013 |
| EP | 0797114 A2 | 9/1997 | ............. G02B/6/44 |
| WO | WO95/34929 | 12/1995 | ......... H02G/15/013 |

\* cited by examiner

*Primary Examiner*—Anthony Knight
*Assistant Examiner*—Alison K. Pickard

(57) ABSTRACT

A sealing body (DK) for cable accessories is provided with cable entrance openings (KEU) in a separation plane (TE) of the sealing body (DK) and with cable entrances (KEN) outside of the separation plane (TE). In the cable entrances (KEN) outside of the separation plane (TE) is arranged a sealing system made of a pressure bushing (AH), a toothed disk (ZS), a sealing bushing (DH) and a thrust bearing bushing (GH).

8 Claims, 5 Drawing Sheets

SEALING ELEMENT FOR CABLE FITTINGS

FIELD OF THE INVENTION

The invention relates to a sealing body for cable accessories made of thermoplastic synthetic material with cable entrance openings in a separation plane of the split sealing body and with a cable catch apparatus.

BACKGROUND OF THE INVENTION

A sealing body for cable accessories made of thermoplastic synthetic material split lengthwise is known from EP 0 408 967 B1, in which, if needed, cable entrance openings can be cut into a separation plane. The sealing body consists of successive lamellae, wherein pressure plates are directed into the interstices between the lamellae, which pressure plates are pressed against the cable sheath inserted cable by inwardly operative pressure means. In this sort of cable catch apparatus, the respective cable is constricted to an acceptable degree and is thereby fixed in its lengthwise direction. Here, however, the pressure plates directed between the sealing lamellae have to be adapted to the respective cable entrance opening. If subsequent cable insertions are required with a sealing body arrangement of this sort, the entire sealing system has to be dismantled, additional cable entrance openings have to be cut and, finally, the seals have to be replaced.

SUMMARY OF THE INVENTION

The goal of the present invention is to provide a sealing body for cable accessories in which it is possible to subsequently provide cable entrances which are independent of cable seals already installed, wherein one has to take into account that every subsequently inserted cable can be caught with a cable catch apparatus. The goal is now met according to the invention with a sealing body of the type mentioned at the outset in that cable entrances are arranged outside of the region of the separation plane of the sealing body; these, cable entrances are provided with fasteners which can be removed if needed; the cable entrances comprise inner threads on both end sides; in each cable entrance with removed fastener a pressure bushing with an outer thread and an inwardly directed fore surface provided with toothed profiles, a toothed disk provided on both sides with toothed profiles, a sealing bushing made of elastic material and a thrust bearing bushing with an outer thread are arranged one after another; and guide profiles are arranged on a fore surface of the sealing body for the insertion of the cable catch apparatus for every inserted cable.

The advantages of the design of the present sealing body according to the invention are particularly to be seen in that cable entrances can be subsequently occupied in already equipped cable accessories without damaging the existing cable entrance systems in the separation plane. In addition, cable catch apparati are provided which are allocated to every cable entrance, and which can be adapted in their position to the diameter of the inserted cable. The cable catch apparati can be connected with one another in a conductive manner by corresponding connections so that shieldings can be combined. The sealing body is split and cable entrance openings are arranged in a known manner in the separation plane for the first insertion, above all as well for the insertion of uncut cables. The cable entrances which may be subsequently required are, in contrast, first provided with a fastener. According to the invention, these cable entrances are each outfitted with a compression sealing system in which a sealing bushing made of elastic material and roughly adapted to the diameter of the cable is used. This sealing bushing is pressed in an axial direction from both sides by a pressure bushing and a thrust bearing bushing, wherein a seal over a large surface between the inserted cable and the wall of the cable entrance results due to the change in shape. A particularity of this inventive sealing system is also to be seen in the fact that, by insertion of a toothed disk between the pressure bushing and the sealing bushing, an escapement against unintended loosening of the pressure bushing is achieved. Here, the system is designed in the manner of a ratchet in that the screwing-in of the pressure bushing is possible, while the unscrewing is inhibited.

The cable catch apparati on the individual cable entrances consist in principle of attachment arches on which each of the cables is clamped with a retainer strap. These attachment arches comprise attachment tongues which are slidingly inserted into guides on the attachment body. These guides are shaped as undercut guide grooves and are located directly on the cable entrances. The attachment tongues are now inserted into the guide grooves and can be oriented by pushing perpendicularly to the insertion direction in accordance with the diameter of the cable.

Sealing bodies according to the invention can be used with cable accessories split lengthwise as well as with hood-shaped cable accessories.

The invention will now be described in more detail by means of eight figures.

DETAILED DESCRIPTION OF THE PREFERRED EMBODIMENT

Figure 1:
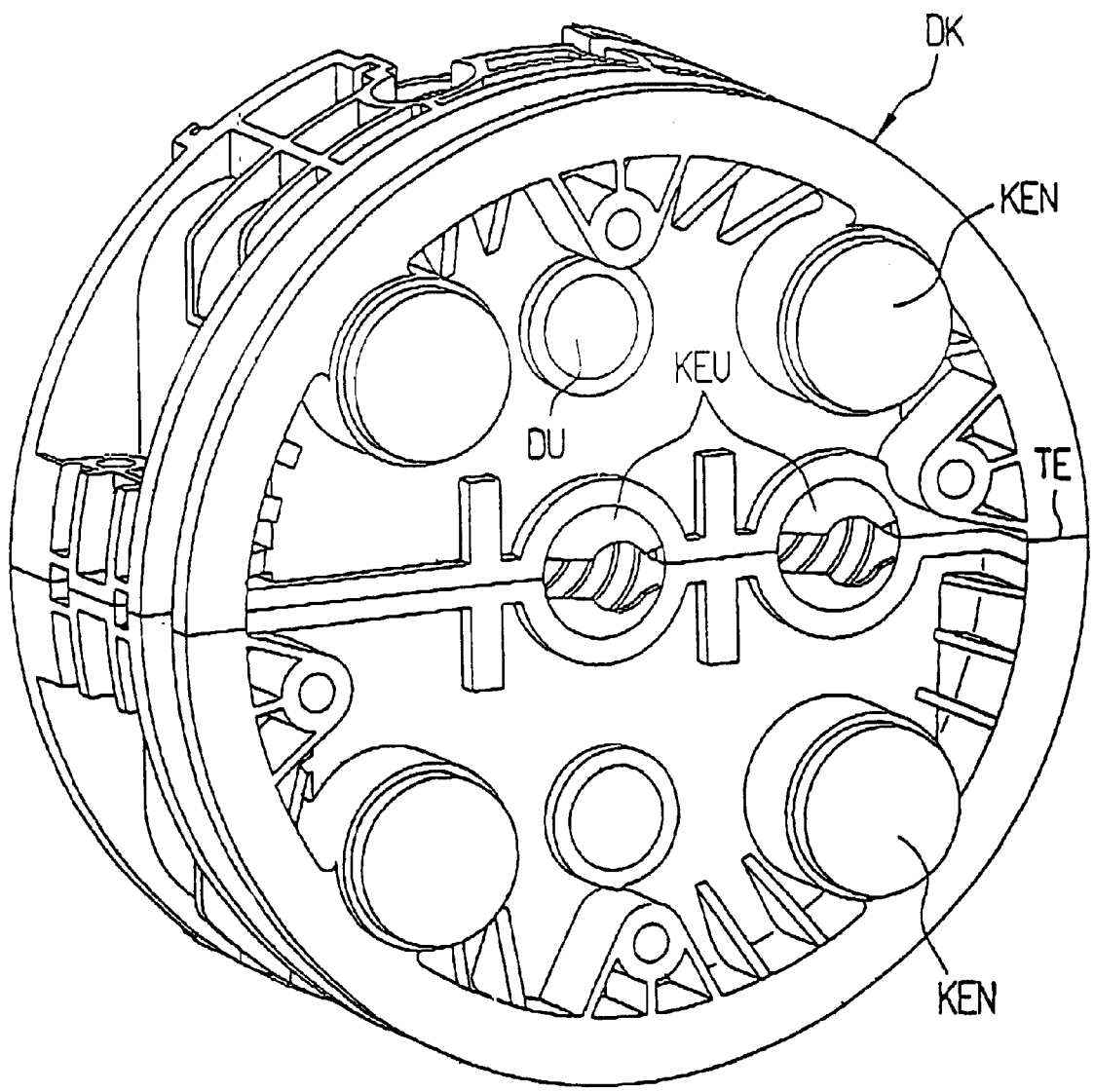
FIG. 1 shows a split sealing body with designs according to the invention.

The sealing body is shown in FIG. 1, which sealing body is provided with cable entrances KEN according to the invention, which cable entrances KEN do not lie in the separation plane TE and, in particular, serve for the introduction of branch cables or cables to be subsequently inserted. Since these cable entrances KEN lie outside of the separation plane TE, the original cable entrance openings KEU can remain untouched in the retrofitting. The cable entrance openings KEU are, however, also suitable for the passage of uncut cable since they lie in the separation plane. Here, conventional sealing systems in the form of successive lamellae of the sealing body with an inserted sealing strip are also used. The sealing systems for sealing between the branch cables or the subsequently inserted cables and the walls of the cable entrances KEN provided to this end are, on the other hand, different. Here, a sealing bushing (not visible here) is used which is pressed axially such that a sealing takes place over a large surface area due to the deformation of the elastic material. It is also shown in this figure that additional passages DU are provided which, depending on need, are equipped with valves, ground passages or the like, wherein they are first closed.

Figure 2:
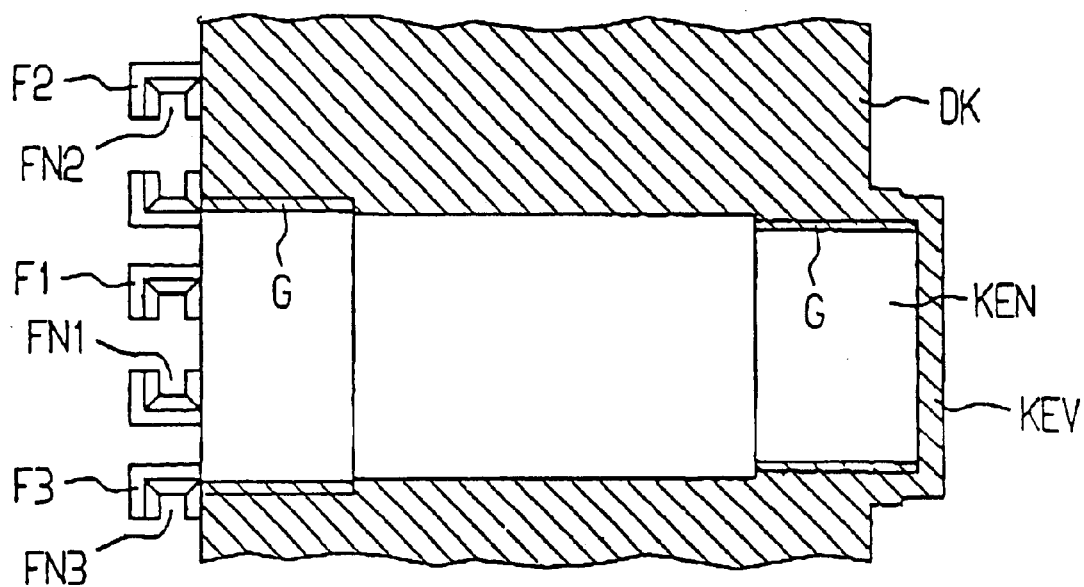
FIG. 2 shows a closed cable entrance for cables to be subsequently inserted.

FIG. 2 shows the cross-section of a cable entrance KEN for the insertion of a cut cable, preferably for subsequent need. Emerging from this figure is the fact that, for the case that it is not used, the cable entrance KEN is provided with a fastener KEV which can be removed according to need. Such a fastener KEV can be formed as a removable wall or for example also as filling. Inner threads G are provided on the border areas of the cable entrance KEN, in which a pressure bushing and a thrust bearing bushing can be axially screwed in. The middle region between both of the inner threads G is provided for the sealing region in which a sealing bushing is pressed. Guides F1, F2, F3 can be recognized on the inner end side of the sealing body DX, which guides are a component of cable catch apparati which are allocated to the individual cable entrances KEN as well as to the original cable entrance. openings KEU. These guides F1, F2, F3 form pair wise undercut guide grooves FN1, FN2, FN3 into which attachment tongues of the cable catch apparati area are slidingly inserted following the introduction, fixing and sealing of the cables. Such a slideable seating of the cable catch apparati allows the adjustment to different cable diameters, wherein a movement in the axial direction is not possible. In this way, a catching of pressure and tugging forces is achieved. The catching of torsion forces is also provided for since the attachment tongues set into the guide grooves do not allow a rotation.

Figure 3:
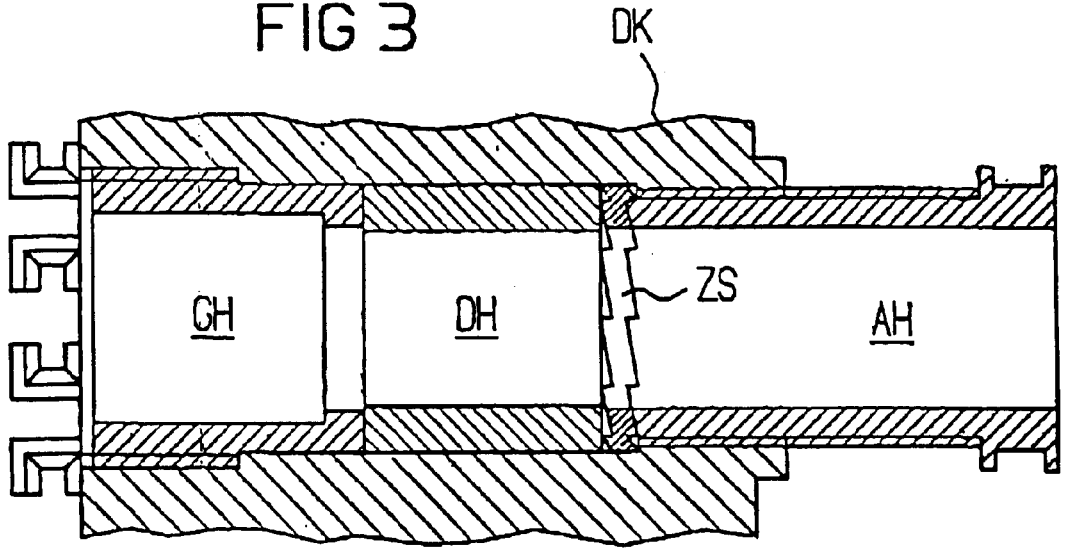
FIG. 3 shows the use of the single elements in a cable entrance.

FIG. 3 shows a cable entrance KEN equipped with the single sealing elements. This sealing system is composed of a pressure bushing AH with an outer thread and a tooth, like-profiled fore side facing a toothed disk ZS, which are successively arranged in the axial direction outward to inward. Connected to this is a sealing bushing DH made of elastic material, wherein the inner diameter of this sealing bushing DH corresponds roughly to the diameter of the cable to be inserted. A thrust bearing bushing GH forms the inner end, which thrust bearing bushing GH serves as the thrust bearing upon pressing the sealing bushing DH by the pressure bushing AH. It also emerges from this figure that the toothed surface of the pressure bushing AH formed at the fore side form-fits to the profiling of the toothed disk ZS. The second inwardly pointing side of the toothed disk ZS is supported by the fore side of the sealing bushing DH and is pressed into the elastic material of the sealing bushing DH by the contact pressure generated by the screwing-in of the pressure bushing AH. In this way it is achieved that, due to the sharp leading edge of the toothed profiling, a turning back and, therefore, an undesired loosening of the contact pressure, is only very difficultly possible. In addition, the sharp interlocking leading edges of the toothed disk ZS and the fore side of the pressure bushing AH do not allow a reverse turning, as is known in the sort of design of a ratchet.

Figure 4:
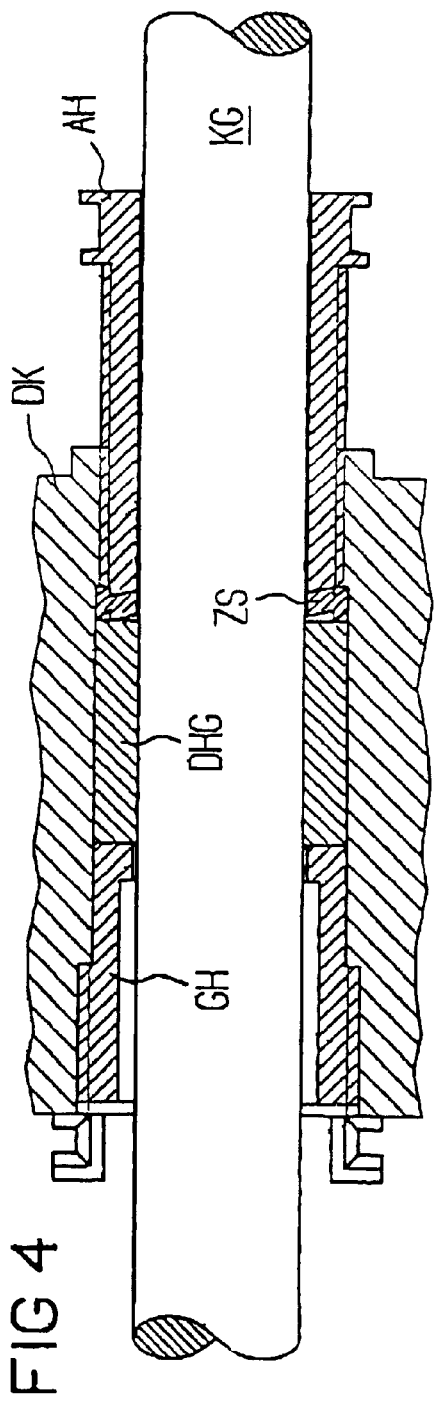
FIG. 4 shows a sealing upon introduction of the cable of largest possible cable diameter.

FIG. 4 conveys the sealing circumstances in one of the previously shown cable entrance KEN upon insertion of a cable KG with a large, here the largest possible, outer diameter. It becomes clear that it is just barely still possible to insert the cable KG into the pressure bushing AH. The inner diameter of the sealing bushing DHG is also chosen corresponding to this, the walls of which sealing bushing DHG are pressed against the inner walls of the cable entrance KEN and against the cable sheath of the cable KG upon screwing-in of the pressure bushing AH. Here, the sealing extends along the entire length of the sealing bushing DHG. The thrust bearing bushing GH serves as a thrust bearing.

Figure 5:
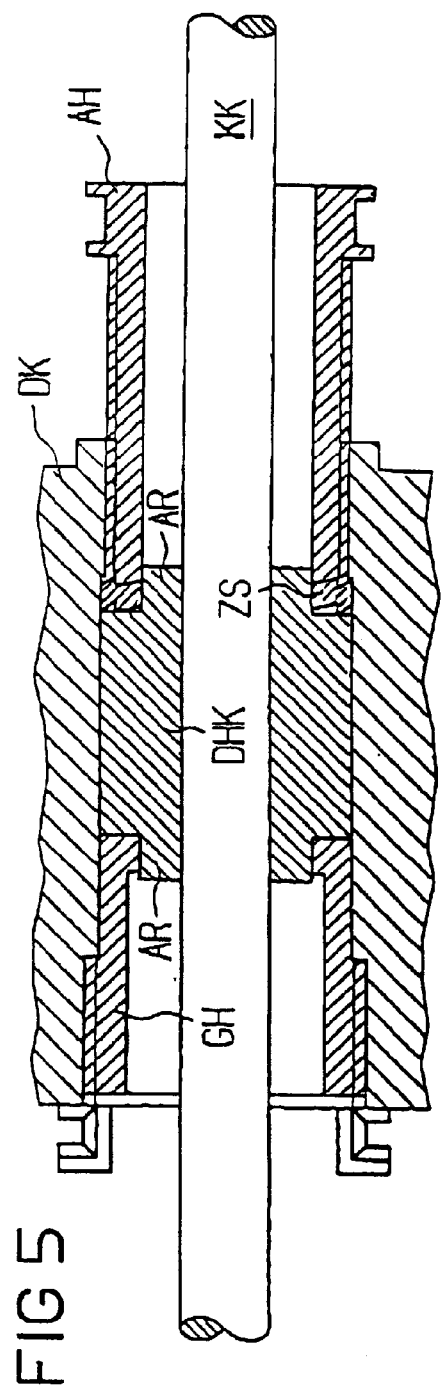
FIG. 5 shows the sealing upon insertion of a cable with a small cable diameter.

FIG. 5 explains the sealing circumstances upon insertion of the cable KK with a small diameter, so that the cable KK runs within the pressure bushing AH and within the thrust bearing bushing GH with corresponding free space. The sealing bushing DH is on the other hand roughly adapted to the diameter of the cable KK in the sealing region, so that once again a form-fitting surface pressing can take place over the entire region. Flange rings AR are formed at the ends of the sealing bushing DH, which flange rings AR are adapted to the inner diameter of the pressure bushing AH and the thrust bearing bushing GH. This way an axial shaping of the sealing bushing DH is prevented.

Figure 6:
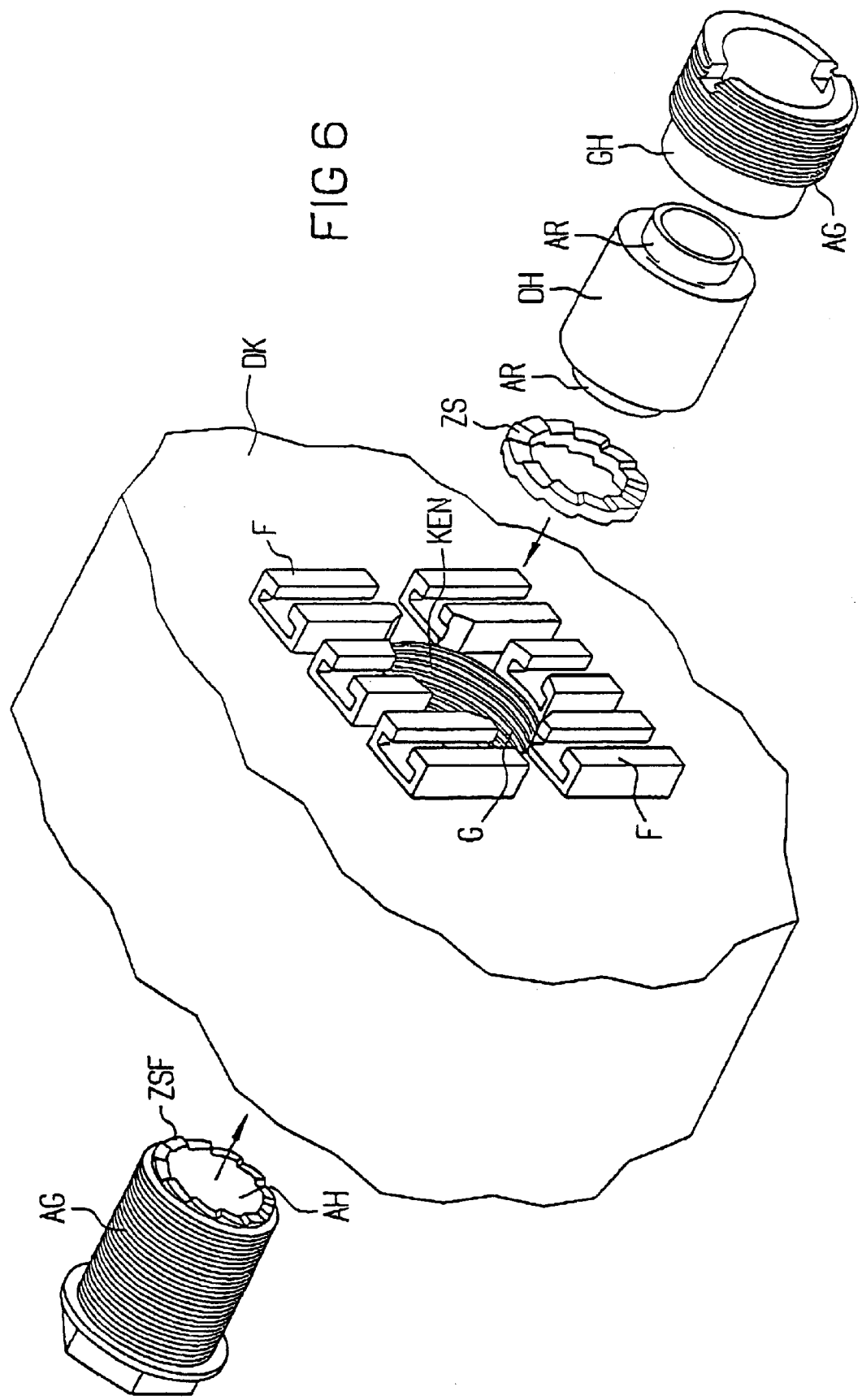
FIG. 6 shows the schematic construction of a cable insertion apparatus in perspective representation.

FIG. 6 shows a cable entrance KEN in the sealing body DK, which cable entrance KEN is equipped with the sealing assembly according to the invention, wherein the sequence of the individual parts and their shapes is rendered better recognizable by the perspective representation. The pressure bushing AH with its outer thread AG is screwed into the inner thread (not visible here) of the cable entrance KEN, wherein the fore surface provided with toothed profilings is pointed inwards. This fore surface ZSF impinges on the toothed disk ZS which is also provided with corresponding toothed profilings, whereby the lock and freeing effect already described is achieved. The second fore surface of the toothed disk ZS is set against the sealing bushing DH and effects the inhibitory effect by engaging in the elastic material of the sealing bushing. Here, the sealing bushing DH is provided for cables with a small diameter; for this reason flange rings AR are formed on the fore sides. The thrust bearing bushing GH finally follows at the end of the sealing system, which thrust bearing bushing GH is provided with an outer thread AG and is screwed into the cable entrance KEN. Guides F are further shown, into which a catch apparatus according to the invention can be inserted.

Figure 7:
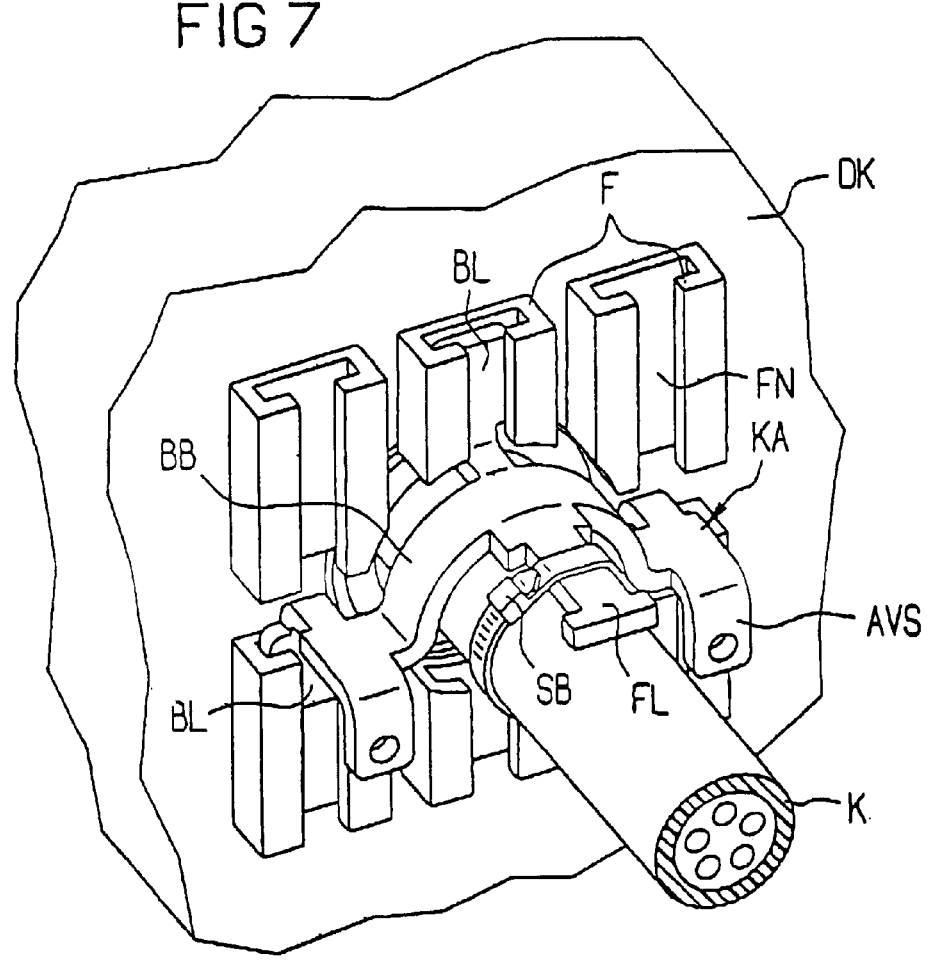
FIG. 7 shows the use of a cable catch apparatus according to the invention.

The use of a cable catch apparatus KA according to the invention is shown in FIG. 7. It consists of an approximately hemispherically bent attachment arch BB with which even the strongest cable can be bridged. Attachment tongues BL are formed on this attachment arch BB, with which attachment tongues BL the cable catch apparatus KA can be hung into undercut guide grooves of the guide profiles F on the sealing body DK. The cable catch apparatus can be moved within the guide grooves FN perpendicular to the insertion direction, so that in this way an adaptation to the diameter of the inserted cable K can take place. The cable K is fixed on a fixing tongue FL of the attachment arch BB with the help of a retainer strap SB. The fixing tongue FL is provided with a recess A in which the retainer strap SB is fed. In this way a fixing in the lengthwise direction is sufficiently provided. Further, the attachment arch BB is provided with flanges AVB for connection rails or connection lines, via which an electrically conductive connection of all cable catch apparati KA can be established.

Figure 8:
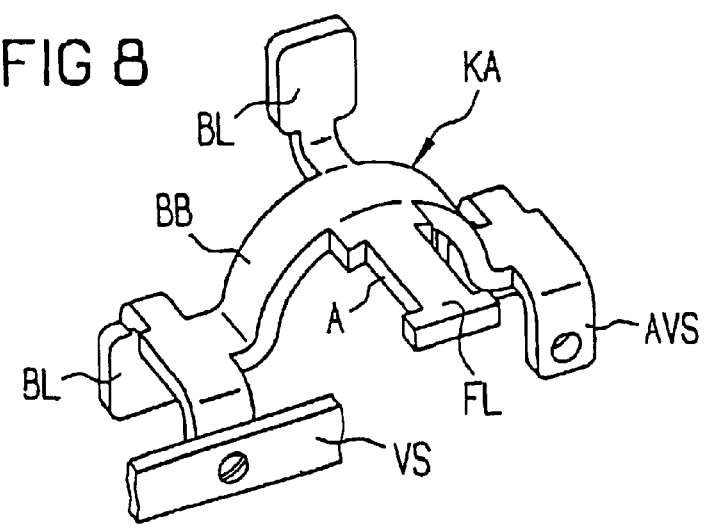
FIG. 8 shows the cable catch apparatus according to the invention.

A cable catch apparatus KA according to the invention is shown in FIG. 8 and is composed of the attachment arch BB and the bent attachment tongues BL, for example here three attachment tongues BL. Flanges AVS for connection rails VS or connection lines are formed on these attachment tongues BL. The fixing tongue FL comprises a recess A for insertion of a retainer strap, whereby a lengthwise slipping is prevented.

What is claimed is:

1. A sealing body for cable accessories made of thermoplastic material with cable entrance openings in a separation plane of the sealing body, characterized in that cable entrances (KEN) are arranged outside of the region of the separation plane (TE) of the sealing body (DK);

the cable entrances (KEN) are provided with removable fasteners (KEV);

the cable entrances (KEN) comprise inner threads (G) on both end sides;

in each cable entrance (KEN) with removed fastener (KEV) a pressure bushing (AH) with an outer thread (AG) and an inwardly directed fore surface provided with toothed profiles (ZSF), a toothed disk (ZS) provided on both sides with toothed profiles, a sealing bushing (DH) made of elastic material and a thrust bearing bushing (GH) with an outer thread (AG) are arranged one after another; and guide profiles (F) are arranged on a fore surface of the sealing body (DK) for receiving a cable catch apparatus (KA) for every inserted cable (K).

2. Sealing body according to claim 1, wherein the foresurface (ZSF) of the pressure bushing (AH) provided with toothed profilings and the toothed profile of the toothed disk (ZS) work correspondingly such that the screwing-in direction of the pressure bushing (AH) is free and the unscrewing direction of the pressure bushing (AH) is blocked with the effect of a ratchet.

3. Sealing body according to claim 1, wherein, the sealing bushing (DH) is roughly adapted to the diameter of the cable in the installation phase.

4. Sealing body according to claim 1, wherein, the guide profiles F in the region of every cable entrance (KEN) and cable entrance opening (KEU) form undercut guide grooves (FN) for receiving attachment tongues (BL) of the cable catch apparatus (KA).

5. Sealing body according to claim 1, wherein, the cable catch apparatus (KA) comprises a hemispherical attachment arch (BB);

a fixing tongue (FL) extending in the cable insertion direction is arranged on the attachment arch (BB) and;

attachment tongues (BL) are arranged on the attachment arch (BB), which attachment tongues (BL) engage in undercut guide grooves (FN) of the sealing body (DK), where a movement within the guide grooves (FN) for adapting the position of the cable catch apparatus (KA) is made possible.

6. Sealing body according to claim 5, wherein the fixing tongue (FL) comprises a recess (A) for receiving a retainer strap (SB).

7. Sealing body according to claim 5, further comprising Flanges (AVS) for connection rails (VS) or connection leads are arranged on the cable catch apparatus (KA).

8. Sealing body according to claim 1, further comprising, passage openings (DU) for valves or electrically conductive connector units are arranged in the fore side of the sealing body (DK).

* * * * *